United States Patent
Chen et al.

(10) Patent No.: US 11,739,233 B2
(45) Date of Patent: Aug. 29, 2023

(54) AQUEOUS DISPERSION OF POLYMERIC PARTICLES HAVING CORE-SHELL STRUCTURE, THE PREPARATION THEREOF AND THE COATING FORMED THEREFROM

(71) Applicant: Guangdong Huarun Paints Co., Ltd., Foshan (CN)

(72) Inventors: Xiaorui Chen, Foshan (CN); Gang Duan, Northbrook, IL (US); Xi Zhao, Foshan (CN)

(73) Assignee: Guangdong Huarun Paints Co., Ltd., Foshan (CN)

( * ) Notice: Subject to any disclaimer, the term of this patent is extended or adjusted under 35 U.S.C. 154(b) by 243 days.

(21) Appl. No.: 16/623,485

(22) PCT Filed: Jun. 21, 2018

(86) PCT No.: PCT/US2018/038708
§ 371 (c)(1),
(2) Date: Dec. 17, 2019

(87) PCT Pub. No.: WO2018/237118
PCT Pub. Date: Dec. 27, 2018

(65) Prior Publication Data
US 2020/0172755 A1    Jun. 4, 2020

(30) Foreign Application Priority Data
Jun. 21, 2017    (CN) .......................... 201710475589.4

(51) Int. Cl.
| C09D 4/00 | (2006.01) |
| C09D 125/14 | (2006.01) |
| C09D 7/40 | (2018.01) |
| C09D 5/00 | (2006.01) |
| C09D 133/06 | (2006.01) |

(52) U.S. Cl.
CPC ............. *C09D 125/14* (2013.01); *C09D 5/00* (2013.01); *C09D 7/70* (2018.01); *C09D 133/062* (2013.01)

(58) Field of Classification Search
CPC .......... C09D 125/14; C09D 5/00; C09D 7/70; C09D 133/06; C09D 151/003; C09D 4/00; C08L 2207/53; C08F 257/02
USPC ........................................................ 523/201
See application file for complete search history.

(56) References Cited

U.S. PATENT DOCUMENTS

| 5,202,375 A | 4/1993 | Biale | |
| 2003/0087991 A1* | 5/2003 | Engel | ................ C09D 123/08 |
| | | | 523/201 |
| 2007/0135567 A1* | 6/2007 | Ruhoff | ............... C09D 133/14 |
| | | | 525/55 |

FOREIGN PATENT DOCUMENTS

| CN | 101838370 A | 9/2010 |
| CN | 102558427 A | 7/2012 |
| CN | 102732121 A | 10/2012 |
| CN | 103387637 A | 11/2013 |
| CN | 104845473 A | 8/2015 |
| CN | 105884976 A1 | 8/2016 |
| CN | 106397662 A | 2/2017 |
| WO | 0220638 A1 | 3/2002 |
| WO | 2016/105502 A1 | 6/2016 |
| WO | 2018/007325 A1 | 1/2018 |

OTHER PUBLICATIONS

English Machine Translation of CN 106397662 (Year: 2015).*
PCT International Search Report for PCT/US2018/038708, dated Oct. 30, 2018, 4 pages.
Charles A.Zezza et.al: "Viscosity Reducton via Monomer Selection in Solvent-Borne High-Solids Styrene/Acrylic Coating Resins", Journal of Coating Technology, vol. 68, No. 856, dated Dec. 31, 1996, p. 49-54.
The first Official Action and search report dated Apr. 20, 2020 for Chinese application No. 201710475589.4, 8 pages.
Office Action for Canadian Patent Application No. 3,067,477, dated Apr. 27, 2022, 3 pages.
Office Action for Canadian Patent Application No. 3,067,477, dated Aug. 24, 2021, 3 pages.
Office Action for Canadian Patent Application No. 3,067,477, dated Mar. 1, 2021, 3 pages.
Office Action for Chinese Patent Application No. 201710475589.4, dated Jan. 6, 2021, 6 pages (including English translation).
Office Action for Chinese Patent Application No. 201710475589.4, dated Sep. 17, 2020, 10 pages (including English translation).

* cited by examiner

*Primary Examiner* — Hannah J Pak

(57) ABSTRACT

The present disclosure is directed to an aqueous dispersion of polymeric particles having core-shell structure, the preparation thereof and the coating formed therefrom. In the polymeric particles, at least one of the polymeric core and the polymeric shell is formed from a monomers mixture comprising isobornyl (meth)acrylate and wherein the isobornyl (meth)acrylate is present in the monomers mixture in an amount of 1 wt % to 40 wt %, relative to the weight of the corresponding monomers mixture for the polymeric core or the polymeric shell.

11 Claims, No Drawings

AQUEOUS DISPERSION OF POLYMERIC PARTICLES HAVING CORE-SHELL STRUCTURE, THE PREPARATION THEREOF AND THE COATING FORMED THEREFROM

This application is a National Stage of International Application No. PCT/US2018/038708, filed on Jun. 21, 2018, which claims priority to Chinese Patent Application No. 201710475589.4, filed on Jun. 21, 2017, both of which are hereby incorporated by reference in their entireties.

TECHNICAL FIELD

The present disclosure relates to an aqueous dispersion of polymeric particles and the preparation thereof. In particular, the present disclosure relates to an aqueous dispersion of polymeric particles having core-shell structure. The present disclosure further relates to a coating with excellent alcohol resistance formed from such an aqueous dispersion of polymeric particles.

BACKGROUND

Aqueous coating compositions can be applied to various products used for various applications such as residential, commercial and industrial applications to form decorative coatings. In addition to providing decorative effects, it is also desirable that the coatings may provide effective protection to the underlying substrate. It is well known that coatings used in home renovations or furniture, especially on dining tables, would inevitably suffer from alcoholic substances. For example, in actual life, there is often a case where alcoholic beverages splash on a table. In this case, the coating's surface might be damaged due to its poor alcohol resistance, and its color would appear darker, thereby weakening its protection to the underlying substrate.

As one of the most important components in an aqueous coating composition, an aqueous latex as a film-forming resin generally determines the basic properties of the coating, such as film-forming properties, durability, weatherability, and the like. In order to impart the coating, the required alcohol resistance, the coating can be provided an enhanced denseness to enhance its resistance to chemicals, or the coating may be provided an increased non-polarity to reduce the affection from a polar alcohol solvent.

There is still a need in coating industry for an aqueous latex having improved alcohol resistance and an alcohol resistant coating formed therefrom.

SUMMARY

In one aspect, the present disclosure provides an aqueous dispersion of polymeric particles having core-shell structure wherein at least one of the polymeric core and the polymeric shell is formed from a monomers mixture comprising isobornyl (meth)acrylate and wherein the isobornyl (meth)acrylate is present in the monomers mixture in an amount of 1 wt % to 40 wt %, relative to the weight of the corresponding monomers mixture for the polymeric core or the polymeric shell.

In one embodiment of the present invention, the isobornyl (meth)acrylate is present in the monomers mixture in an amount of 9 wt % or less, preferably 8 wt % or less, more preferably 7 wt % or less, still more preferably 6 wt % or less, even more preferably 5 wt % or less, furthermore preferably 4 wt % or less relative to the weight of the corresponding monomers mixture for the polymeric core or the polymeric shell.

In another aspect, the present disclosure provides a process for the preparation of an aqueous dispersion of polymeric particles having core-shell structure comprising
a) carrying out an emulsion polymerization of a monomers mixture to form polymeric particles for a polymeric core; and
b) in the presence of the emulsion containing the polymeric core particles as a seed, carrying out an emulsion polymerization of another monomers mixture, to form the polymeric particles having core-shell structure,
wherein at least one of the polymeric core and the polymeric shell is formed from a monomers mixture comprising isobornyl (meth)acrylate and wherein the isobornyl (meth)acrylate is present in the monomers mixture in an amount of 1 wt % to 40 wt %, relative to the weight of the corresponding monomers mixtures for the polymeric core or the polymeric shell.

In still another aspect, the present disclosure provides a coating formed from above aqueous dispersion of polymeric particles.

The present aqueous dispersion comprises polymeric particles having core-shell structure, at least one of the polymeric core and the polymeric shell being formed from a monomers mixture comprising isobornyl (meth)acrylate. The coating formed from such aqueous dispersion exhibits significantly improved alcohol resistance. The present inventors have surprisingly found that such aqueous latex with above structure can form a coating with significantly improved ethanol resistance even with a lower amount of isobornyl (meth)acrylate, which was not foreseen prior to the present disclosure.

The details of one or more embodiments of the invention will be set forth in description below. The other features, objectives, and advantages of the invention will become apparent.

SELECTED DEFINITIONS

As used herein, "a", "an", "the", "at least one", and "one or more" are used interchangeably, unless indicated otherwise. Thus, for example, a coating composition that comprises "an" additive can be interpreted to mean that the coating composition includes "one or more" additives.

Throughout the present disclosure, where compositions are described as having, including, or comprising specific components or fractions, or where processes are described as having, including, or comprising specific process steps, it is contemplated that the compositions or processes as disclosed herein may further comprise other components or fractions or steps, whether or not specifically mentioned in this disclosure, as long as such components or steps do not affect the basic and novel characteristics of the invention, but it is also contemplated that the compositions or processes may consist essentially of, or consist of, the recited components or steps.

For the sake of brevity, only certain ranges are explicitly disclosed herein. However, ranges from any lower limit may be combined with any upper limit to recite a range not explicitly recited, ranges from any lower limit may be combined with any other lower limit to recite a range not explicitly recited, and in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

As used herein, the term, "an aqueous latex" refers to a stable dispersion of synthetic resins, i.e. polymers, in the form of microparticles in an aqueous liquid medium with the aid of, if necessary, a suitable dispersing aid, such as an emulsifier. Thus, when directed to "a polymer" as used in the present disclosure, the term "an aqueous latex" and "an aqueous dispersion" may be used alternatively, unless otherwise stated.

The term "comprises" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

DETAILED DESCRIPTION

According to a first aspect of the present invention, there is provided an aqueous latex comprising polymeric particles having core-shell structure, wherein at least one of said polymer core and said polymer shell is formed from a monomers mixture comprising isoborneol (meth)acrylate and the isobornyl (meth)acrylate is present in an amount of 1 wt % to 40 wt % relative to the weight of the corresponding monomers mixture used to form the polymer core or the polymer shell.

In the aqueous latex of the present dispersion, the polymeric particles have a core-shell structure in which at least one of the polymer core and the polymer shell is formed from a monomers mixture containing isobornyl (meth)acrylate. When used in this context, "at least one of the polymer core and the polymer shell is formed from a monomers mixture containing isobornyl (meth)acrylate" refers to the polymer core, the polymer shell or both are formed from a monomers mixture containing isobornyl (meth)acrylate. According to one embodiment of the present disclosure, the polymer core is formed from a monomers mixture containing isobornyl (meth)acrylate. According to another embodiment of the present disclosure, the polymer shell is formed from a monomers mixture containing isobornyl (meth)acrylate. According to another embodiment of the present disclosure, the polymer core and the polymer shell both are formed from a monomers mixture containing isobornyl (meth)acrylate. Preferably, the polymer shell is formed from a monomers mixture containing isobornyl (meth)acrylate.

The present inventors have found that isobornyl (meth) acrylate acts as a main ingredient that imparts the alcohol resistance of the coating. Without wishing to be bound by theory, it is believed that isobornyl (meth)acrylate has a low overall polarity, and thus may increase the resistance of the coating film to a polar medium such as ethanol. In order to obtain coatings with excellent alcohol resistance, it is often desirable to use larger amounts of isobornyl (meth)acrylate to provide coatings with lower polarity. For example, Chinese patent application CN101838370A teaches that in order to effectively enhance water resistance, alcohol resistance and hardness of a coating film, a higher content of isobornyl methacrylate monomer is required in which examples the minimum amount content of isobornyl methacrylate is 9.1% by weight, based on the weight of the total monomer mixture used to form the polymer particles in the aqueous latex.

However, the present inventors have surprisingly found that when an aqueous latex formed from a monomer mixture containing isobornyl (meth)acrylate comprises polymeric particles having a core-shell structure, the aqueous latex has significantly improved ethanol resistance, even with a significantly lower level of isobornyl (meth)acrylate.

In the aqueous latex of the present disclosure, isobornyl (meth)acrylate is present in an amount of 1 wt % to 40 wt % relative to the weight of the corresponding monomers mixture used to form the polymer core or the polymer shell. According to embodiments of the present disclosure, isobornyl (meth)acrylate may be present in an amount of 9 wt % or less relative to the corresponding monomers mixture used to form the polymer core or the polymer shell. Preferably, the isobornyl (meth)acrylate may be used in an amount of 8 wt % or less, more preferably 7 wt % or less, still more preferably 6 wt % or less, even more preferably 5 wt % or less relative to the weight of the monomers mixture used to form the polymer core or the polymer shell. For example, in one embodiment of the present invention, the amount of isobornyl (meth)acrylate can be as low as 1.3 wt % relative to the weight of the monomers mixture used to form the polymer core or the polymer shell. The coating formed from the aqueous latex of the present disclosure has comparable, even better, ethanol resistance over the coating formed from an aqueous latex with a significantly higher amount of isobornyl (meth)acrylate, which is unexpected prior to the present disclosure.

With regard to polymeric particles, the "weight ratio of the polymer core and the polymer shell" refers to the ratio of the weight of the monomer or monomers mixture used to form the polymer core to the weight of monomer or monomers mixture used to form the polymer shell. The weight ratio of the polymer core to the polymer shell can be selected as desired. In an embodiment of the present invention, the weight ratio of the polymer core to the polymer shell is between 1:4 and 1:1. Preferably, the weight ratio of the polymer core to the polymer shell is in the range of 1:3 to 1:1, more preferably in the range of 1:2.5 to 1:1.5.

Preparation of Aqueous Latex

According to another aspect of the present disclosure, there is provided a process for the preparation of an aqueous dispersion of polymeric particles having core-shell structure comprising a) carrying out an emulsion polymerization of a monomers mixture to form polymeric particles for a polymeric core; and b) in the presence of the emulsion containing the polymeric core particles as a seed, carrying out an emulsion polymerization of another monomers mixture, to form the acrylics polymeric particles having core-shell structure, wherein at least one of the polymeric core and the polymeric shell is formed from a monomers mixture comprising isobornyl (meth)acrylate and wherein the isobornyl (meth)acrylate is present in the monomers mixture in an amount of 1 wt % to 40 wt %, relative to the weight of the corresponding monomers mixtures for the polymeric core or the polymeric shell.

Emulsion polymerization techniques for preparing an aqueous latex from ethylenically unsaturated monomers are well known in the polymer field, and any conventional emulsion polymerization process can be used, such as single-stage polymerization processes, multi-stage polymerization processes, continuous processes, and the like. It is well known that an aqueous latex can be prepared using a seed polymerization process so that the structure and composition of the polymer particles contained in the aqueous latex may be controlled.

In one embodiment of the present disclosure, the aqueous latex is prepared by a) dispersing the monomers mixture used to form polymer core in water to form an emulsion with the aid of a suitable emulsifier, and then dropwise adding the formulated emulsion into a polymerization reactor containing an initiator to carry out polymerization, thereby forming a seed emulsion as a polymer core; b) subsequently carrying out emulsion polymerization of another monomers mixture used to form polymer shell in the presence of the seed emulsion described above and optionally in the presence of a suitable emulsifier, thereby forming polymer particles having core-shell structure.

According to the present disclosure, the polymer core is formed from a monomers mixture containing, relative to the total weight of the monomers mixture,
i) 1 to 40% by weight of isobornyl (meth)acrylate monomer,
ii) 0 to 5% by weight of at least one ethylenically unsaturated monomer having a carboxylic acid functional group, and
iii) 55 to 99% by weight of at least one other ethylenically unsaturated monomer other than the above monomers.

Preferably, the polymer core is formed by polymerization of a monomers mixture comprising, relative to the total weight of the monomer mixture,
i) 1 to 9% by weight of isobornyl (meth)acrylate monomers,
ii) 0 to 5% by weight of at least one ethylenically unsaturated monomer having a carboxylic acid functional group, and
iii) 86 to 99% by weight of at least one ethylenically unsaturated monomer other than the above monomers.

According to the present disclosure, the polymer shell is formed by polymerization of another monomers mixture comprising, relative to the total weight of the other monomers mixture,
i) 1 to 40% by weight of isobornyl (meth)acrylate monomer,
ii) 0 to 5% by weight of at least one ethylenically unsaturated monomer having carboxylic acid functional groups,
iii) 0 to 5% by weight of at least one cross-linking monomer, and
iv) 50 to 99% by weight of at least one ethylenically unsaturated monomer other than the above monomers.

Preferably, the polymer shell is formed by polymerization of another monomer mixture comprising, relative to the total weight of the other monomer mixture,
i) 1 to 9% by weight of isobornyl (meth)acrylate monomer,
ii) 0 to 5% by weight of at least one ethylenically unsaturated monomer having carboxylic acid functional groups,
iii) 0 to 5% by weight of at least one cross-linking monomer, and
iv) 81 to 99% by weight of at least one ethylenically unsaturated monomer other than the above monomers.

Isobornyl (Meth)Acrylate

According to the present disclosure, the monomer mixture used to prepare the polymer core or polymer shell comprises isobornyl (meth)acrylate. Isobornyl (meth)acrylate contains a huge non-polar bicycloalkyl group, which can produce steric hindrance protection effects, allowing the polymers formed therefrom to have outstanding high gloss, sharpness, scratch resistance, resistance to media and durability. Moreover, the polarity of isobornyl (meth)acrylate itself is low and thus its incorporation can significantly increase the coating's resistance to polar media, particularly alcoholic media.

According to the aqueous latex of the present disclosure, the amount of isobornyl (meth)acrylate may be relatively low.

Suitably, the amount of isobornyl (meth)acrylate used is in the range of 1 to 40% by weight, preferably 9% by weight or less, more preferably 8 wt % or less, still more preferably 7 wt % or less, even more preferably 6 wt % or less, particularly preferably 5 wt % or less, for example, 4 wt % or less, relative to the weight of the monomers mixture used to form the polymer core. In one embodiment of the present disclosure, the amount of isobornyl (meth)acrylate used is in the range of 1 to 5% by weight with respect to the weight of the monomers mixture used to form the polymer core. In another embodiment of the present disclosure, the amount of isobornyl (meth)acrylate used is in the range of 1-3.9 wt % with respect to the weight of the monomers mixture used for the polymer core. In another embodiment of the present disclosure, the amount of isobornyl (meth)acrylate used is in the range of 1-1.3% by weight relative to the weight of the monomers mixture used for the polymer core.

Suitably, the amount of isobornyl (meth)acrylate used is in the range of 1 to 40% by weight, preferably 9% by weight or less, more preferably 8 wt % or less, still more preferably 7 wt % or less, even more preferably 6 wt % or less, particularly preferably 5 wt % or less, for example, 4 wt % or less, relative to the weight of the monomers mixture used to form the polymer shell. In one embodiment of the present disclosure, the amount of isobornyl (meth)acrylate used is in the range of 1 to 5% by weight with respect to the weight of the monomers mixture used to form the polymer shell. In another embodiment of the present disclosure, the amount of isobornyl (meth)acrylate used is in the range of 1-3.9 wt % with respect to the weight of the monomers mixture used for the polymer shell. In another embodiment of the present disclosure, the amount of isobornyl (meth)acrylate used is in the range of 1-1.3% by weight with respect to the weight of the monomers mixture used for the polymer shell.

ii) Ethylenically Unsaturated Monomers with Carboxylic Acid Functional Groups

According to the present disclosure, the monomer mixture used to prepare the polymer core or polymer shell may optionally comprise ethylenically unsaturated monomers having carboxylic acid functional groups. The presence of such olefinically unsaturated monomers having carboxylic acid functional groups additionally provides a stable aqueous latex. Examples of the above ethylenically unsaturated monomers include acrylic acid, methacrylic acid, β-acryloxypropionic acid, ethacrylic acid, α-chloroacrylic acid, crotonic acid, α-phenylacrylic acid, cinnamic acid, chlorocinnamic acid, itaconic acid, maleic acid, and combinations thereof. Preferably, methacrylic acid is used as an example of the above ethylenically unsaturated monomers having carboxylic acid functional groups.

In the aqueous latex according to the present disclosure, the amount of the above-mentioned ethylenically unsaturated monomers having carboxylic acid functional groups may be in the range of 0 to 5% by weight, preferably in the range of 0.1 to 5% by weight, more preferably in the range of 0.2 to 3% by weight with respect to the weight of the monomers mixture used for preparing the polymer core. A lower amount of the ethylenically unsaturated monomers having carboxylic acid functional groups is advantageous for obtaining a stable aqueous latex. Therefore, the amount of the aforementioned ethylenically unsaturated monomers having carboxylic acid functional groups is preferably in the range of 0.5 to 2% by weight with respect to the weight of the monomers mixture used in the preparation of the polymer core.

In the aqueous latex according to the present disclosure, the amount of the above-mentioned ethylenically unsaturated monomers having carboxylic acid functional groups may be in the range of 0 to 5% by weight, preferably in the range of 0.1 to 5% by weight, more preferably in the range of 0.2 to 3% by weight with respect to the weight of the monomers mixture used for preparing the polymer shell. A lower amount of the ethylenically unsaturated monomer having a carboxylic acid functional group is advantageous for obtaining a stable aqueous latex. Therefore, the amount of the aforementioned ethylenically unsaturated monomers having carboxylic acid functional groups is preferably in the range of 0.5 to 2% by weight with respect to the weight of the monomer mixture used in the preparation of the polymer shell.

iii) Crosslinking Monomer

According to the present disclosure, the monomers mixture used for preparing the polymer shell may optionally comprise a crosslinking monomer. In the present disclosure, "crosslinking monomer" is a monomer capable of providing two or more reaction sites that may form a chemical bond or a hydrogen bond. The addition of cross-linking monomers can increase the cross-linking extent among polymers and greatly increase the chemical resistance of the coating.

The crosslinking monomer in the monomers mixture used to prepare the polymer shell of the present disclosure include, but are not limited to, 2-hydroxyethyl acrylate, 2-hydroxypropyl acrylate, 2-hydroxybutyl acrylate, 2-hydroxyethyl methacrylate, 2-hydroxypropyl methacrylate, 4-hydroxybutyl methacrylate, glycidyl methacrylate, allyl acrylate, allyl methacrylate, acetoacetyl acrylate, diacetone acrylamide, adipic acid dihydrazide, N-methylol acrylamide, 2-(dimethylamino) ethyl acrylate, 2-(dimethylamino) ethyl methacrylate, trimethylolpropane trimethacrylate, diethylene glycol diacrylate, diethylene glycol dimethacrylate, 1,4-butanediol diacrylate, 1,6-hexanediol diacrylate, γ-methacryloxypropyltrimethoxysilane, tris(2-hydroxyethyl methacrylate) phosphate, monomers having formula (I) or combinations thereof:

$(CH_2\alpha CR_1R_2)_p$—$R_3$          Formula (I)

in which $R_1$ can be H or $CH_3$; $R_2$ is —(C(O))—O— or —(C(O))—O—NH; p is an integer of 2 to 6; $R_3$ is —$(CH_2)_r$—$(CH_2$—$CH_2$—$O)_s$—$(O$—$CH(CH_3)$—$CH_2)_t$—$R_4$; $R_4$ is alkyl or arylalkyl; and r, s, and t are each independently an integer of 0 or greater than 0, and the sum of r, s and t is an integer less than or equal to 16. The polyfunctional monomers of the above formula (I) include, but are not limited to, dipropylene glycol diacrylate (DPGDA), tripropylene glycol diacrylate (TPGDA), 1,6-hexanediol diacrylate (HDDA), diethylene glycol dimethacrylate (DEGDMA), diethylene glycol dimethacrylate (EGDMA), tricyclodecane dimethanol diacrylate (TCDMDA), trimethylolpropane triacrylate (TMPTA) trimethylolpropane trimethacrylate (TMPTMA), pentaerythritol triacrylate (PETIA), di-(trimethylolpropane) tetraacrylate (DI-TMPTA) and dipentaerythritol hexaacrylate (DPHA) or its combination. The above crosslinking monomers may be used alone or in combination.

In one embodiment of the present disclosure, diacetone acrylamide is used as a crosslinking monomer. The present inventors have surprisingly found that such a cross-linking monomer can be used in combination with hydrazides compounds so as to increase the chemical resistance, in particular the ethanol resistance, of the coating formed from the aqueous latex of the invention.

According to the present disclosure, the above crosslinking monomer may be used in an amount ranging from 0 to 5% by weight, preferably from 0.1 to 5% by weight, more preferably from 0.1 to 3% by weight relative to the weight of the monomers mixture used in the preparation of the polymer shell. Lower amounts of cross-linking monomers are advantageous for providing aqueous latexes with suitable application performance. Therefore, the amount of the cross-linking monomer described above is preferably in the range of 0.2 to 1 wt % with respect to the weight of the monomers mixture used in the preparation of the polymer shell.

iv) Other Ethylenically Unsaturated Monomers

According to the present disclosure, the monomers mixture used to prepare the polymer core or polymer shell of the present disclosure may contain other ethylenically unsaturated monomers. As used herein, "other ethylenically unsaturated monomers" include any radically polymerizable ethylenically unsaturated compound other than above mentioned isobornyl (meth)acrylate, ethylenically unsaturated monomers having carboxyl functional groups, and cross-linking monomers. Suitably, examples of other ethylenically unsaturated monomers include styrenes (such as styrene, alpha-methyl styrene, vinyl toluene, vinyl naphthalene), halogenated olefins (such as vinyl chloride, vinylidene chloride, vinyl fluoride, tetrafluoroethylene, hexafluoropropylene), allyl ethers such as allyl anisole, vinyl acetate, vinyl versatate such as commercially available vinyl versatate VeoVa 10, (meth)acrylamide, acrylonitriles (such as acrylonitrile, methacrylonitrile), allyl urea, $C_1$-$C_{16}$ alkyl (meth)acrylate, alkoxyalkyl (meth)acrylate and its combination.

Preferably, styrenes, alkyl (meth)acrylates, (meth)acrylamide, allyl urea or combinations thereof are selected as ethylenically unsaturated monomers. More preferably, styrenes, C1-16 alkyl (meth)acrylates, (meth)acrylamide, allyl urea, or combinations thereof are used. Examples of suitable C1-16 alkyl (meth)acrylates include, but are not limited to, methyl (meth)acrylate, ethyl (meth)acrylate, propyl (meth)acrylate, isopropyl (meth)acrylate, butyl (meth)acrylate, isobutyl (meth)acrylate, amyl (meth)acrylate, isoamyl (meth)acrylate, hexyl (meth)acrylate, 2-ethylhexyl (meth)acrylate, cyclohexyl (meth)acrylate, decyl (meth)acrylate, isodecyl (meth)acrylate, lauryl (meth)acrylate, octyl (meth)acrylate, nonyl (meth)acrylate, or mixtures thereof. In embodiments of the present disclosure, other ethylenically unsaturated monomers include styrene, methyl (meth)acrylate, 2-ethylhexyl (meth)acrylate, or combinations thereof.

The amount of other ethylenically unsaturated monomers mentioned above can be adjusted according to actual demands (such as Tg, mechanical strength, and the like). In consideration of practical operability and cost, the proportion of other ethylenically unsaturated compounds in the monomers mixture used for preparing the aqueous latex is generally high. In the aqueous latex of the present disclosure, the polymer core comprises 55 to 99% by weight, preferably 65 to 99% by weight, more preferably 75 to 99% by weight, still more preferably 80 to 99% by weight, even more preferably 86 to 99% by weight of the above-mentioned other ethylenically unsaturated monomers relative to the weight of the monomers mixture used to form the polymer core. In the aqueous latex of the present disclosure, the polymer shell comprises 60 to 99% by weight, preferably 65 to 99% by weight, more preferably 70 to 99% by weight, still more preferably 76 to 99% by weight, even more preferably 81 to 99% by weight other ethylenically unsaturated monomers relative to the weight of the monomers mixture for forming the polymer shell.

Dispersion of the above polymerizable monomers can be accomplished with the aid of any known emulsifier. Examples of useful emulsifiers include any well-known anionic surfactants, nonionic surfactants, or combinations thereof. For example, some suitable surfactants for emulsion polymerization are disclosed in McCutcheon's Detergents and Emulsifiers (MC Publishing Co., Glen Rock, N.J.). Other types of stabilizing agents can also be used, such as protective colloids. Preferably, a combination of an anionic surfactant and a nonionic surfactant is used. Anionic surfactants include aliphatic carboxylates, aliphatic sulfonates, aliphatic sulfates, and aliphatic phosphates. Preferably, their salts of alkali metals such as Na, K or Li, or of alkaline earth metal salts such as Ca or Ba are used. In a specific embodiment, aliphatic sulphonates, preferably alkali dodecylsulphonates, more preferably sodium dodecylsulphate (SDSs), are used. Nonionic surfactants include alkyl phenol polyoxyethylene ethers, fatty alcohol polyoxyethylene ethers. Preferably, alkylphenol polyoxyethylene ethers are used. In a specific embodiment, octylphenol polyoxyethylene ether (OP-10) is used.

Any known free radical initiator can be used to initiate the polymerization reaction. Examples of useful initiators include initiators that thermally decompose to produce free radicals at the polymerization temperature. Examples include water soluble and water insoluble initiators. Examples of radical-generating initiators include persulfates such as ammonium persulfate or alkali persulfate (including potassium, sodium or lithium); peroxides such as cumene hydroperoxide, tert-butyl hydroperoxide, di-tert-butyl peroxide, dioctyl peroxide, tert-butyl pervalerate, tert-butyl perisononate, tert-butyl peroctoate, tert-butyl perneodecanoate, peroxyl di(2-ethylhexyl)dicarbonate, bis(isotridecyl) peroxydicarbonate; azo compounds such as azobis(isobutyronitrile) and azobis(4-cyanovaleric acid)); and conventional redox systems. Preferably, a water-soluble initiator persulfate is used. More specifically, ammonium persulfate is used as a radical initiator.

In the preparation of the aqueous latex of the present disclosure, the amounts of the emulsifier and the initiator and the reaction conditions such as the reaction temperature, the stirring speed, and the like can be determined empirically by those skilled in the art. Preferably, the pre-emulsification process of the monomers mixture is performed at a stirring speed of 2000 rpm or more, preferably at a stirring speed of 4000 rpm or more.

Coating

According to another aspect of the present disclosure, there is provided a coating formed from the aqueous latex of the present disclosure described above.

The present inventors surprisingly found that the coating formed from the aqueous latex of the present disclosure has particularly excellent ethanol resistance. The coating formed from the aqueous latex of the present disclosure has comparable, even better, ethanol resistance over the coating formed with an aqueous latex with a significantly higher amount of isobornyl (meth)acrylate, which is unexpected prior to the present invention.

In one embodiment of the present disclosure, the coating formed from the present aqueous latex is capable of resisting 2000 or more times of scrub with 99% ethanol as measured according to HG/T4756-2014 under a loading of 500 g when it is applied with a wet film thickness of 200 μm and cured at a temperature of 50° C. for 1 hour.

In one embodiment of the present disclosure, the coating formed from the present aqueous latex is capable of resisting 500 or more times of scrub with 99% ethanol as measured according to HG/T4756-2014 under a loading of 500 g when it is applied with a wet film thickness of 200 μm and cured at a temperature of 50° C. for 30 minutes.

In one embodiment of the present disclosure, the coating formed from the present aqueous latex exhibits a chemical resistance of a rate of at least 5, with 50% aqueous ethanol solution of, preferably 65% aqueous ethanol solution, more preferably 80% aqueous ethanol solution, still more preferably 95 aqueous ethanol solution as measured according to GB/T 23999-2009 when it is applied with a wet film thickness of 100 μm and cured at room temperature for 6 days.

EXAMPLES

The present disclosure is more particularly described in the following examples that are intended as illustrations only, since numerous modifications and variations within the scope of the present disclosure will be apparent to those skilled in the art. Unless otherwise noted, all parts, percentages, and ratios reported in the following examples are on a weight basis, and all reagents used in the examples are commercially available and used directly without further treatment.

Example 1

General Procedure for Preparing Aqueous Latex

In a four-neck flask, a homogeneous mixture of 50-60 wt % of styrene, 0-10 wt % of 2-ethylhexyl acrylate, 0-5 wt % methacrylic acid and 40-50 wt % of methyl methacylate, relative to the total weight of the monomer mixture forming the polymer core was added as a monomer mixture. Next, the monomer mixture was emulsified in a certain amount of water in the presence of a certain amount of emulsifier to form a pre-emulsion. In another four-necked flask equipped with a stirrer, a thermocouple, and a condenser, a certain amount of initiator was added, and the temperature was raised with stirring. After the temperature was raised to a predetermined temperature, the pre-emulsion was added dropwise over 2 hours. After the addition was completed, the temperature was maintained at a predetermined temperature for a certain period of time to form a seed emulsion.

In a four-necked flask, a homogeneous mixture of 30-40 wt % of 2-ethylhexyl acrylate, 0-5 wt % of methacrylic acid, 50-60 wt % of methyl methacrylate, 0-5 wt % of diacetone acrylamide, 0-5 wt % of allyl urea and 0-5 wt % of acrylamide relative to the total weight of the monomer mixture forming the polymer shell was added as a monomer mixture. Next, the monomer mixture was emulsified in a quantity of water in the presence of a certain amount of emulsifier to form a pre-emulsion. The thus-formed pre-emulsion was slowly added dropwise to the above obtained seed emulsion while a certain amount of initiator was added dropwise. After the completion of the addition, the solution was kept at a predetermined temperature for a while. Then, the temperature was lowered, and the pH of the reaction mixture was adjusted to between 7.5 and 8.5 with ammonia.

In the preparation of the aqueous latex of the present disclosure, isobornyl (meth)acrylate may be added to the monomer mixture for preparing a polymer core or polymer shell as needed. Table 1 below summarizes the aqueous latex synthesized according to the above general procedure.

TABLE 1 the present synthesized aqueous latex comprising polymeric particles having core-shell structure

| Examples | Ex 1 | Ex 2 | Ex 3 | Ex 4 | Ex 5 | Ex 6 |
|---|---|---|---|---|---|---|
| IBOMA Content | In shell 1.3 wt % | In core 1.3 wt % | In shell 3.9 wt % | In core 3.9 wt % | In shell 5 wt % | In core 5 wt % |

Example 2

Resistance to Ethanol Wipe

The above aqueous latexes of Examples 1 to 6 were coated with a 200 μm applicator on a PVC film and dried at 50° C. for a certain period of time to produce a coating to be tested. The aqueous latex prepared according to Example 11 of Chinese Patent CN101838370A was used as a control aqueous latex, which was dried and cured under the same conditions to form a control coating. And then, according to the standard HG/T4756-2014, these coatings were scrubbed with 99% ethanol for up to 1 hour under a load of 500 g to determine its resistance to ethanol wipe. The test results are summarized in Table 2 below.

TABLE 2

Resistance of ethanol wipe of various coatings

| Curing conditions | Control | Ex 1 | Ex 2 | Ex 3 | Ex 4 | Ex 5 | Ex 6 |
|---|---|---|---|---|---|---|---|
| 50° C./1 h | 66 | >2000 | >2000 | >2000 | >2000 | >2000 | >2000 |
| 50° C./0.5 h | 73 | 1326 | 674 | >2000 | 692 | >2000 | 716 |

From the results shown in Table 2 above, it can be seen that the aqueous latex of the present disclosure has significantly higher resistance to ethanol wipe than the aqueous latex with higher isobornyl methacrylate content as prepared by the method of CN121838370A, in which the latex with isobornyl methacrylate in its shell may produce the coating having better ethanol wipe resistance than those in which isobornyl methacrylate is present in its core.

Example 3

Resistance to Ethanol Immersion

The above aqueous latexes of Examples 1 to 6 were applied with a 100 μm applicator on a wood plate coated with an aged PU sealer and sanded with a 320-grit sandpaper to form a film, which film was dried at room temperature for a certain period of time to form coating to be tested. The aqueous latex prepared according to Example 11 of Chinese Patent CN101838370A was used as a control aqueous latex, which was dried and cured under the same conditions to form a control coating. The coatings were then impregnated with a specific concentration of ethanol for 1 hour to determine the ethanol immersion resistance of each coating according to the standard GB/T 23999-2009. Ethanol immersion resistance is generally classified into a 0 to 5 scale, in which rank 5 is the best; rank 0 is the worst.

TABLE 3 resistance to ethanol immersion

| Curing conditions | Ethanol Concn. | Control | Ex 1 | Ex 2 | Ex 3 | Ex 4 | Ex 5 | Ex 6 |
|---|---|---|---|---|---|---|---|---|
| 12 h | 95% | 2 | 2 | 2 | 3 | 2 | 3 | 3 |
|  | 80% | 2 | 2 | 2 | 3 | 2 | 3 | 3 |
|  | 65% | 2 | 3 | 3 | 3 | 3 | 4 | 4 |
|  | 50% | 3 | 4 | 4 | 4 | 4 | 4 | 4 |
| 72 h | 95% | 2 | 3 | 3 | 3 | 3 | 5 | 5 |
|  | 80% | 2 | 3 | 3 | 3 | 3 | 5 | 5 |
|  | 65% | 3 | 5 | 4 | 4 | 3 | 5 | 5 |
|  | 50% | 3 | 5 | 5 | 5 | 5 | 5 | 5 |
| 6 d | 95% | 2 | 5 | 5 | 5 | 5 | 5 | 5 |
|  | 80% | 2 | 5 | 5 | 5 | 5 | 5 | 5 |
|  | 65% | 2 | 5 | 5 | 5 | 5 | 5 | 5 |
|  | 50% | 3 | 5 | 5 | 5 | 5 | 5 | 5 |

From the results shown in Table 3 above, it can be seen that the aqueous latex of the present disclosure has significantly higher ethanol impregnation resistance than the aqueous latex of isobornyl methacrylate prepared by the method of CN121838370A.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. An aqueous dispersion of polymeric particles having core-shell structure,
    wherein the polymeric core and the polymeric shell is formed from monomers mixture comprising isobornyl (meth)acrylate;
    wherein the monomers mixture of the polymeric shell comprises, relative to the total weight of the monomers mixture,
i) 1 to 9 wt % of isobornyl (meth)acrylate monomer;
ii) 0.1 to 5 wt % of diacetone acrylamide, wherein the diacetone acrylamide is used as a crosslinking monomer;
iii) 0 to 5 wt. % of at least one ethylenically unsaturated monomer with a carboxylic acid functionality; and
iv) 81 to 99 wt. % of at least one ethylenically unsaturated monomer other than monomers i) and iii), the wt. % being relative to the total weight of the monomers i), ii), iii), and iv).

2. The aqueous dispersion according to claim 1, wherein the isobornyl (meth)acrylate is present in the monomers mixture in the amount of 1 wt % to 8 wt %, relative to the weight of the corresponding monomers mixture for the polymeric core or the polymeric shell.

3. The aqueous dispersion according to claim 1, wherein the isobornyl (meth)acrylate is present in the monomers mixture in the amount of 1 wt % to 7 wt %, relative to the weight of the corresponding monomers mixture for the polymeric core or the polymeric shell.

4. The aqueous dispersion according to claim 1, wherein the isobornyl (meth)acrylate is present in the monomers mixture in the amount of 1 wt % to 6 wt %, relative to the weight of the corresponding monomers mixture for the polymeric core or the polymeric shell.

5. The aqueous dispersion according to claim 1, wherein the isobornyl (meth)acrylate is present in the monomers mixture in the amount of 1 wt % to 5 wt %, relative to the weight of the corresponding monomers mixture for the polymeric core or the polymeric shell.

6. The aqueous dispersion according to claim 1, wherein the weight ratio of the polymeric core and the polymeric shell is in the range of 1:4 to 1:1, based on the weight of the monomers mixture for the polymeric core or the polymeric shell.

7. The aqueous dispersion according to claim 1, wherein the monomers mixture of the polymeric core comprises, relative to the total weight of the monomers mixture,
    i) 1 to 9 wt % of isobornyl (meth)acrylate monomer;
    ii) 0 to 5 wt. % of at least one ethylenically unsaturated monomer with a carboxylic acid functionality; and
    iii) 86 to 99 wt. % of at least one ethylenically unsaturated monomer other than monomers i) and ii),
        the wt. % being relative to the total weight of the monomers i), ii), and iii).

8. A coating formed from the aqueous dispersion of polymeric particles with core-shell structure as claimed in claim 1.

9. The coating according to claim 8, wherein the coating is capable of resisting 2000 or more times of scrub with 99% ethanol as measured according to HG/T4756-2014 under a loading of 500 g when it is applied with a wet film thickness of 200 μm and cured at a temperature of 50° C. for 1 hour.

10. The coating according to claim 8, wherein the coating is capable of resisting 500 or more times of scrub with 99% ethanol as measured according to HG/T4756-2014 under a loading of 500 g when it is applied with a wet film thickness of 200 μm and cured at a temperature of 50° C. for 30 minutes.

11. The coating according to claim 8, wherein the coating exhibits a chemical resistance of a rate of at least 5, with 50% aqueous ethanol solution, or with 65% aqueous ethanol solution, or with 80% aqueous ethanol solution, or with 95 aqueous ethanol solution as measured according to GB/T 23999-2009 when it is applied with a wet film thickness of 100 μm and cured at room temperature for 6 days.

* * * * *